(12) United States Patent
Farwell

(10) Patent No.: US 11,899,291 B2
(45) Date of Patent: *Feb. 13, 2024

(54) BALANCING LOSSES IN SEMICONDUCTOR OPTICAL WAVEGUIDES

(71) Applicant: Lumentum Technology UK Limited, Towcester (GB)

(72) Inventor: Selina Farwell, Northamptonshire (GB)

(73) Assignee: Lumentum Technology UK Limited, Northamptonshire (GB)

( * ) Notice: Subject to any disclaimer, the term of this patent is extended or adjusted under 35 U.S.C. 154(b) by 884 days.

This patent is subject to a terminal disclaimer.

(21) Appl. No.: 16/957,309

(22) PCT Filed: Dec. 21, 2018

(86) PCT No.: PCT/GB2018/053766
§ 371 (c)(1),
(2) Date: Jun. 23, 2020

(87) PCT Pub. No.: WO2019/130020
PCT Pub. Date: Jul. 4, 2019

(65) Prior Publication Data
US 2023/0194906 A1   Jun. 22, 2023

(30) Foreign Application Priority Data
Dec. 29, 2017   (GB) .................................... 1722293

(51) Int. Cl.
*G02F 1/025* (2006.01)
*G02F 1/015* (2006.01)

(52) U.S. Cl.
CPC ............ *G02F 1/0155* (2021.01); *G02F 1/025* (2013.01)

(58) Field of Classification Search
CPC ............................... G02F 1/0155; G02F 1/025

USPC .......................................................... 385/1–3
See application file for complete search history.

(56) References Cited

U.S. PATENT DOCUMENTS 5,309,532 A     5/1994 Chang et al.
5,463,461 A *  10/1995 Horiuchi ................ H04B 10/60
                                                           398/202

(Continued)

FOREIGN PATENT DOCUMENTS

AU      2016264737 A1   12/2017
CN         102396196 A    3/2012

(Continued)

OTHER PUBLICATIONS

"Integrated Photonics" by Pollock et al., ISBN 978-1-4419-5398-8 (Year: 2003).*

(Continued)

*Primary Examiner* — Robert Tavlykaev
(74) *Attorney, Agent, or Firm* — Harrity & Harrity, LLP

(57) ABSTRACT

A method of equalising optical losses, at a required operating wavelength, in waveguide sections in an optoelectronic device comprising a first semiconductor waveguide section and a second semiconductor waveguide section, the method comprising determining (1301) a first optical loss through the first waveguide section for a signal with the required operating wavelength, determining (1302) a second optical loss through the second waveguide section for the signal, determining (1303) a loss difference between the first optical loss and the second optical loss, determining (1304) a first bias voltage based on the loss difference and the operating wavelength, such that the loss difference is reduced, and applying (1305) the bias voltage to the first waveguide section.

14 Claims, 16 Drawing Sheets

Determining a range for a negative bias voltage for the first waveguide section for which an optical loss of the waveguide section is lower than an optical loss at zero bias for the wavelength range. — 1501

Selecting a bias voltage within the range. — 1502

Determining a second bias voltage based on the first bias voltage, the loss difference and the operating wavelength, such that the optical loss difference is reduced. — 1503

Applying the second bias voltage to the second waveguide section. — 1504

(56) References Cited

U.S. PATENT DOCUMENTS

| | | | |
|---|---|---|---|
| 8,406,621 B2* | 3/2013 | Painchaud | H04B 10/676 |
| | | | 398/16 |
| 9,020,367 B2 | 4/2015 | Jones et al. | |
| 10,749,601 B2 | 8/2020 | Urino | |
| 2004/0027634 A1* | 2/2004 | Bond | G02F 1/025 |
| | | | 359/240 |
| 2006/0093362 A1 | 5/2006 | Welch et al. | |
| 2007/0237443 A1 | 10/2007 | Geis et al. | |
| 2015/0139667 A1* | 5/2015 | Takeuchi | G02F 1/225 |
| | | | 398/214 |

FOREIGN PATENT DOCUMENTS

| | | |
|---|---|---|
| CN | 103293715 A | 9/2013 |
| CN | 104954076 A | 9/2015 |
| EP | 1217425 A1 | 6/2002 |
| WO | 2010095018 A2 | 8/2010 |

OTHER PUBLICATIONS

"Modeling of Optical Waveguide Modulators on III-V Semiconductors" by Glingener et al., IEEE Journal of Quantum Electronics, vol. 31, No. 1, pp. 101-112 (Year: 1995).*

"Numerical analysis of Ge/Si hybrid MOS optical modulator operating at midinfrared wavelength" by Taguchi et al., Japanese Journal of Applied Physics 58, paper SBBE03 (Year: 2019).*

Mar. 20, 2019 International Search Report and Written Opinion issued in International Application No. PCT/GB2018/053766, 11 pages.

* cited by examiner

BALANCING LOSSES IN SEMICONDUCTOR OPTICAL WAVEGUIDES

CROSS-REFERENCE TO RELATED APPLICATIONS

This application is a 371 national stage of PCT Application No. PCT/GB2018/053766, filed on Dec. 21, 2018, and entitled "BALANCING LOSSES IN SEMICONDUCTOR OPTICAL WAVEGUIDES," which claims priority to United Kingdom Patent Application No. 1722293.6, filed on Dec. 29, 2017, and entitled "BALANCING LOSSES IN SEMICONDUCTOR OPTICAL WAVEGUIDES," which are incorporated by reference herein.

TECHNICAL FIELD

The technical field is balancing losses in semiconductor optical waveguides.

BACKGROUND

Coherent detection in optical systems is of increasing interest as the demand for bandwidths increases. In contrast to intensity modulation and direct detection (IMDD) systems, which measure the power of an optical signal, coherent detection enables the use of amplitude, frequency and phase of a signal. FIG. 1 is a schematic diagram of a typical coherent detector 100. FIG. 1 shows an input 101 for a received signal, which is combined with a local oscillator 102, using an optical coupler 103, wherein the combined signal is detected by photodiode 104. Typically detectors such as that of FIG. 1 use a balanced detector, comprising a pair of photodiodes, each of which is attached to an output of a coupler. Balanced detectors enable the removal of any DC component from the signal.

More sophisticated devices enable the use of polarization and phase modulation. FIG. 2 is a schematic diagram of detector 200 for an optical system which uses both phase and polarization modulation. In the device of FIG. 2 there is provided a received signal 201 and a local oscillator 202. The signal is fed into a polarization splitter 203, which then passes a first polarization (X) to a first 90° hybrid coupler 204 and a second polarization (Y), via phase rotator 205 to a second hybrid coupler 206. The signal from the local oscillator 202 is divider by a beam splitter 207, which divides the signal between the two hybrid couplers. A set of four balanced couplers are provided 208, 209, 210, 211, which each comprise a pair of photodetectors. The output signals of the four balanced detectors correspond respectively to the X polarized, in phase component XI 212, the X polarized quadrature component XQ 213, the Y polarized, in phase component YI 214 and the Y polarized quadrature component YQ 215. Similar arrangements to that of FIG. 2 may be used for the detection of QPSK, QAM and other modulation schemes which combine amplitude, phase and polarization.

In all such devices, the use of a balanced detector enables the elimination of DC components of the signal. In order to achieve this, the loss in each branch of a coupler must be as far as possible the same. Differences in loss between branches will result in different effective photo-sensitivities in the two photodetectors. FIG. 3 is a schematic diagram of a coherent photo-detector 300, which has two branches, left 301 and right 302. Four photodetector P1 303, P2 304, P3 305, and P4 306 are provided. P1 and P2 are paired as a first balanced photodetector 307 and P3 and P4 are paired as a second balanced photodetector 308.

FIG. 4 is a graph 400 on which is plotted experimental results of photodiode responsivity 401 plotted against wavelength 402, for a typical device according to FIG. 3. The results were obtained for four photodiodes in the detector. With an ideal device, the results for the four detectors would be identical. However, it can clearly be seen that, due to differential path losses for different branches, the responsivities of the photodetectors differ. The critical differences are between the photodiodes which make up the pairs in the balanced detectors, i.e. the difference PD1 and PD2 403 and that between PD3 and PD4 404.

FIG. 5 is a graph 500 which shows the results for the second branch of the same detector. As in FIG. 4, the graph is a plot of photodiode responsivity 501 plotted against wavelength 502. The two graphs considered together give an example of the type of variation in optical losses through couplers.

An important design parameter for such devices is the Common Mode rejection Ratio (CMRR), which may be calculated using equation 1:

$$CMRR = 20 \times \log_{10}\left(\frac{PD1 - PD2}{PD1 + PD2}\right) \qquad \text{Equation 1}$$

An important device commonly used in such detectors is the Multimode Interference (MMI) coupler. FIG. 6 is a schematic diagram of a typical multimode interference coupler 600. It comprises two or more single mode inputs 601, two or more single mode outputs 602 and a wide multimode section 603. The essential principle of operation relies on the interference pattern created in the multimode section. Such devices are generally low loss and largely wavelength independent. However manufacturing imperfections may result in an imperfect power split ratio. In coherent detectors such as those of FIG. 2 or FIG. 3, this would result in each photodetector having a slightly different responsivity.

Electrical tuning has been proposed to vary the split ratio between branches of MMI couplers. The tuning of splitting ratios in MMI's is enabled by the fact that the input field in MMI's is reproduced in single or multiple images at periodic intervals along the direction of propagation. The interference patterns of the self-images at one interval lead to the formation of new self-images at the next interval, finally leading to the output images. The output images can therefore be modified by changing the refractive index at points within intervals of the MMI where the self-images occur. This will change the phase relations between the self-images at the points where the change occurs and the self-images at a subsequent interval.

This tuning is applied to the multimode section of an MMI coupler. FIG. 7 is a schematic diagram of such an arrangement 700, showing the inputs 701, the outputs 702, wide multimode section 703 and the tuning electrodes 704. The interference patterns 705 are altered by the biasing voltage applied by the tuning electrodes. Such electrical tuning is applied to the multimode section of the device.

SUMMARY

Accordingly, the present disclosure seeks to improve the optical loss balance between arms of a coupler by applying negative bias to the outputs rather than a tuning bias to the body of the coupler.

According to a first aspect, there is provided a method of equalising optical losses, at a required operating wavelength, in waveguide sections in an optoelectronic device comprising a first semiconductor waveguide section and a second semiconductor waveguide section. The method comprises determining a first optical loss through the first waveguide section for a signal with the required operating wavelength, determining a second optical loss through the second waveguide section for the signal, determining a loss difference between the first optical loss and the second optical loss, determining a first bias voltage based on the loss difference and the operating wavelength, such that the loss difference is reduced, and applying the bias voltage to the first waveguide section.

In an embodiment, a second bias voltage is determined based on the loss difference, the operating wavelength and the first bias voltage, and the second bias voltage is applied to the second waveguide section.

In an embodiment, at least one of the first bias voltage and the second bias voltage is selected such as to respectively reduce at least one of the first optical loss and the second optical loss.

In an embodiment, the step of determining the first bias voltage comprises determining a range of negative bias voltages for which, when the negative bias is applied to the first waveguide section, an optical loss in the waveguide section at the required operating wavelength is lower than an optical loss when zero bias is applied to the first waveguide section for the operating wavelength, and selecting a bias voltage within the range.

In an embodiment, the method further comprising determining a second bias voltage and applying the second bias voltage to the second waveguide section, wherein determining the second bias voltage comprises determining a bias voltage based on the first bias voltage, the loss difference and the operating wavelength, such that the optical loss difference is reduced.

In an embodiment, the optoelectronic device is an optical coupler and the first waveguide section and the second waveguide sections are optically connected respectively to a first output and a second output of the coupler.

In an embodiment, the coupler is a multi-mode interference coupler.

In an embodiment, the coupler is used in a balanced optical detector.

In an embodiment, the coupler is used in a coherent optical detector.

According to a second aspect, there is provided an optoelectronic device comprising a first waveguide section with a first optical loss and a second waveguide section with a second optical loss, and a biasing apparatus for providing a negative bias voltage across the first waveguide section, wherein the negative bias is selected such that, when applied to the first waveguide section, a difference between the first optical loss and the second optical loss is reduced.

In an embodiment, the optoelectronic device further comprises a second biasing apparatus for providing a negative bias voltage across the second waveguide section.

BRIEF DESCRIPTION OF THE DRAWINGS

The above and other aspects of the present invention will now be described by way of example only, with reference to the following figures.

DETAILED DESCRIPTION

Figure 1:
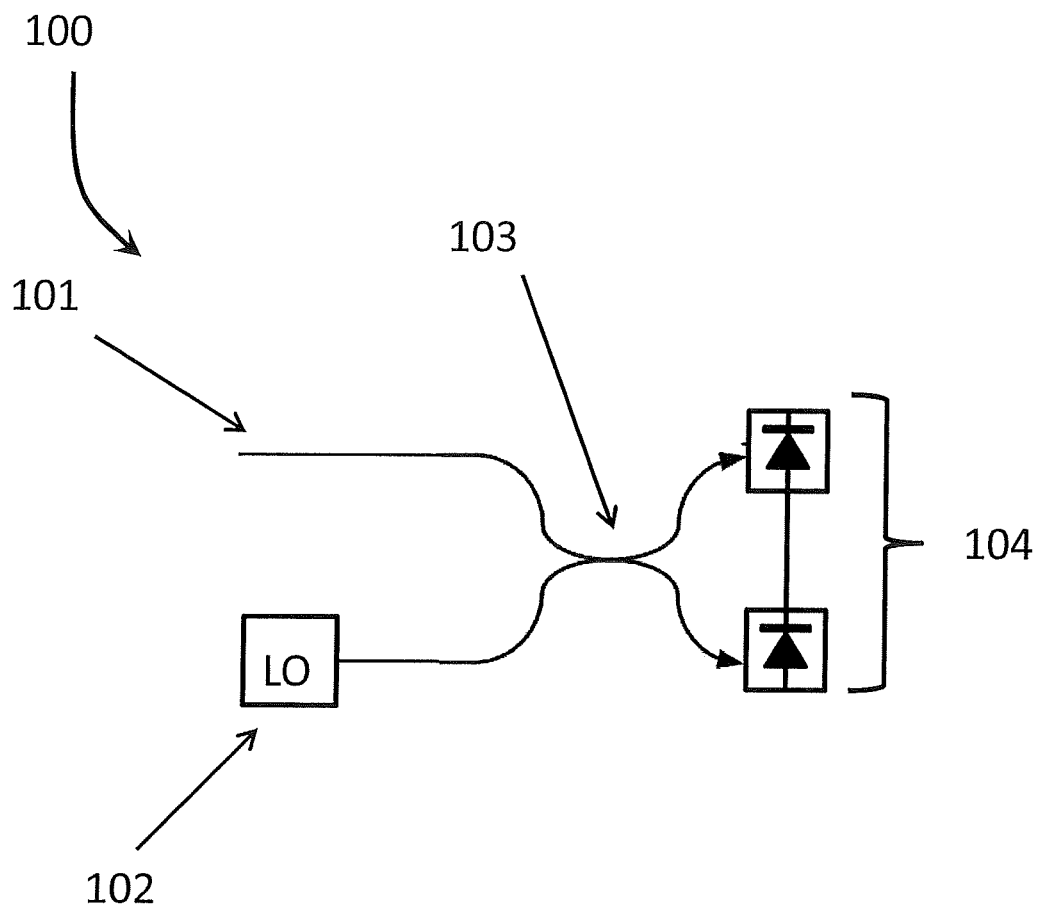
FIG. 1 is a schematic diagram of a coherent detector with a balanced photodetector according to the prior art.
Figure 2:
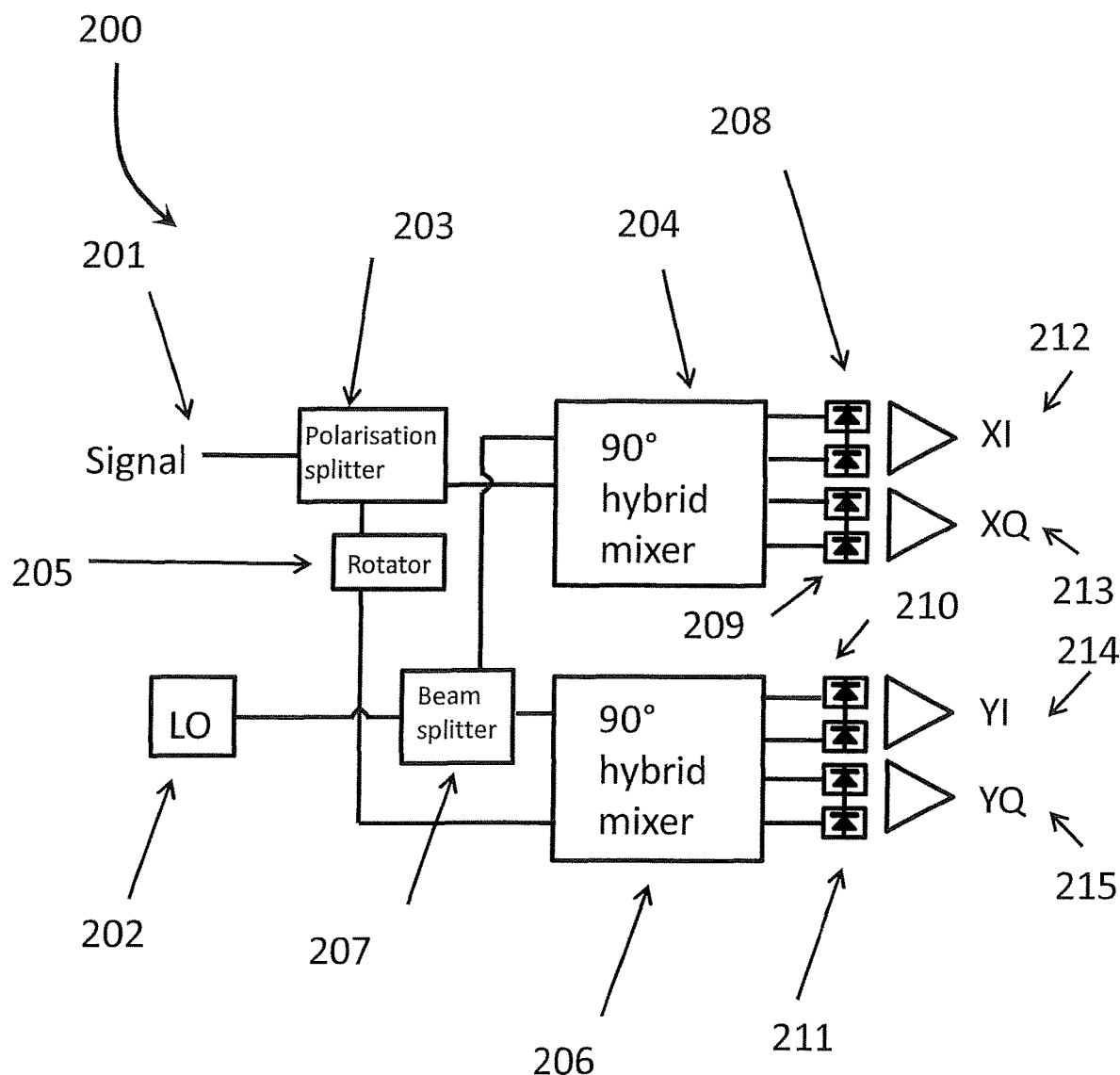
FIG. 2 is a schematic diagram of a coherent detector with multiple balanced photodetectors linked with the external signal and local oscillator for detection of polarization and phase modulation, according to the prior art.
Figure 3:
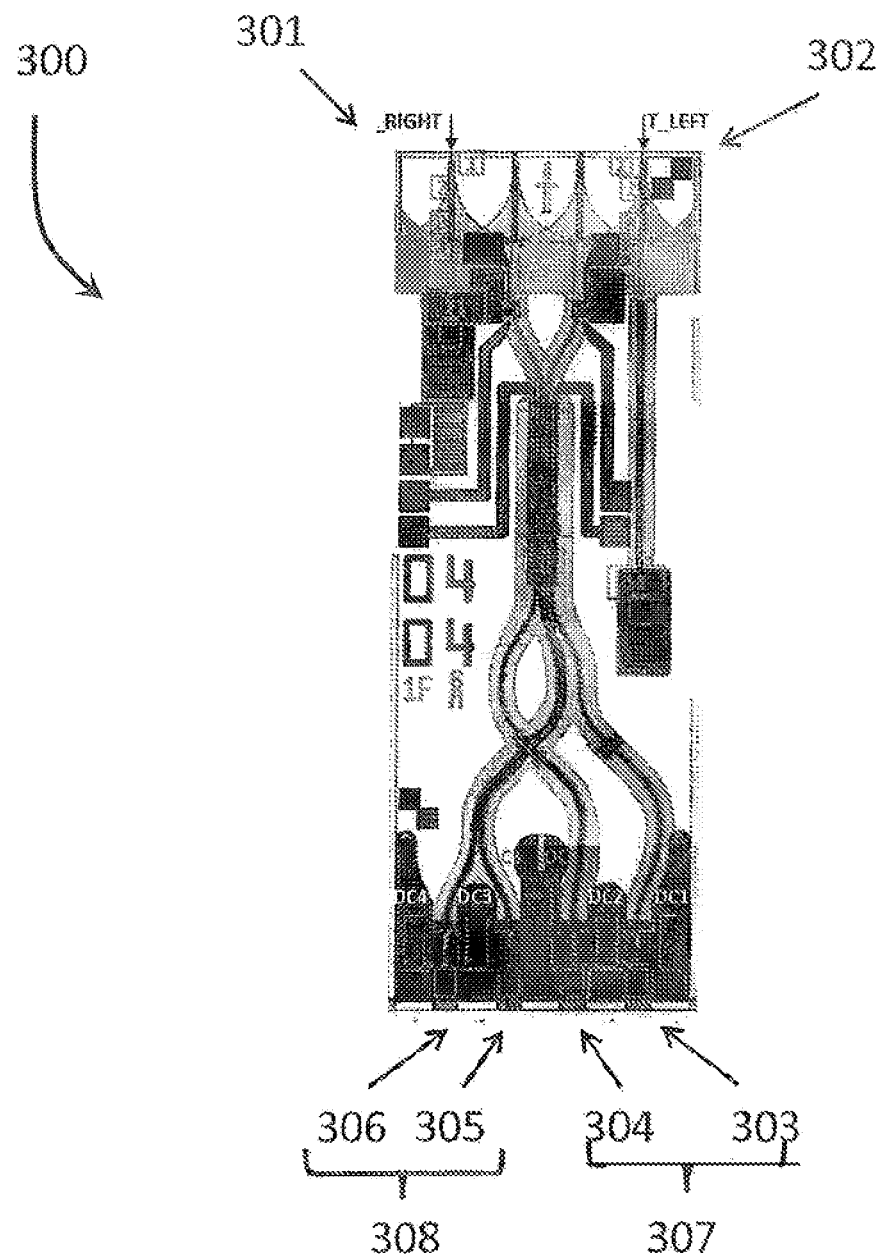
FIG. 3 is a schematic diagram of a coherent detector used for obtaining the experimental data plotted in FIGS. 4 and 5.
Figure 4:
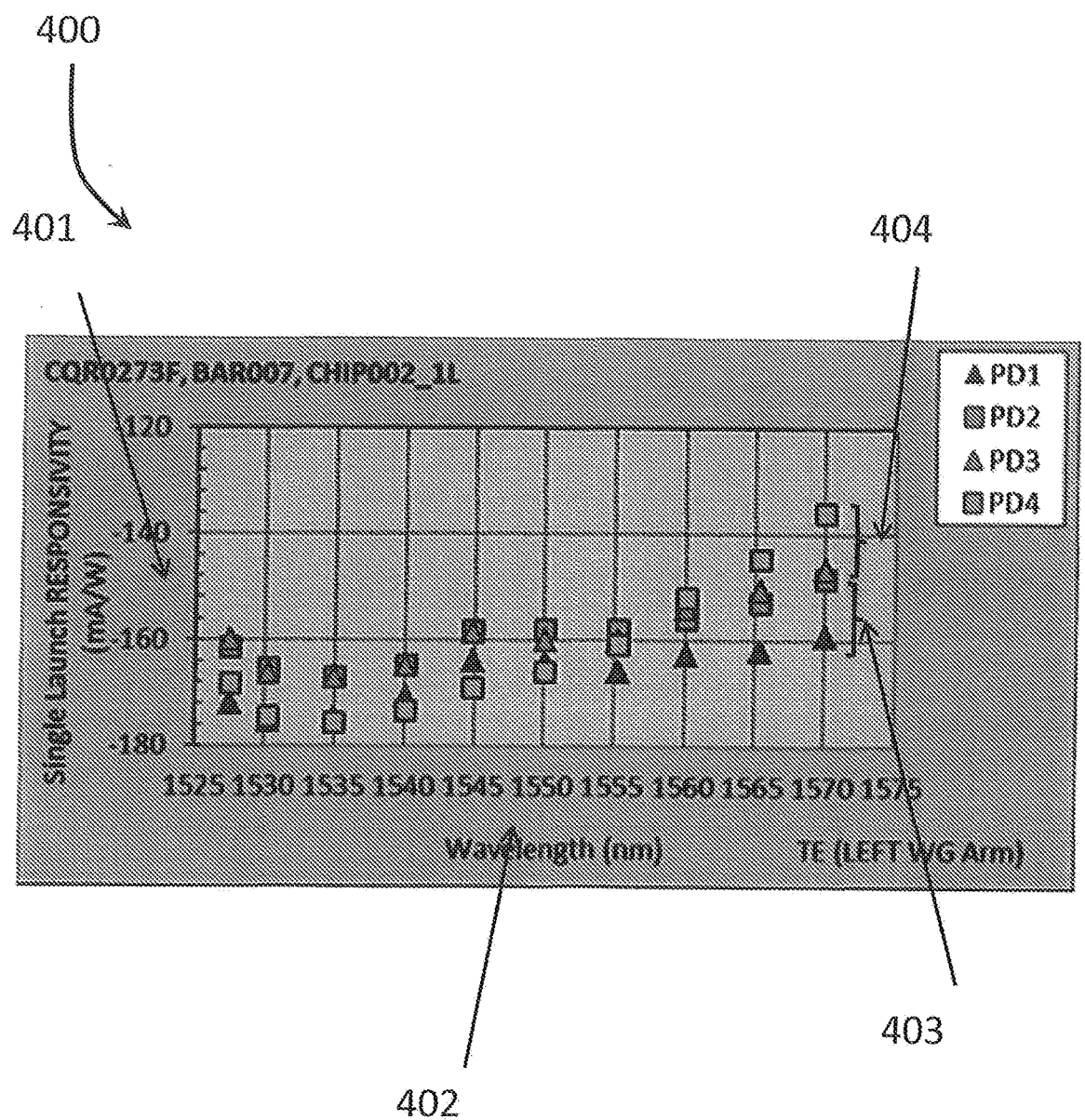
FIG. 4 is a graph of experimental results of photodiode responsivity plotted against wavelength, measured on an arm of a coherent detector.
Figure 5:
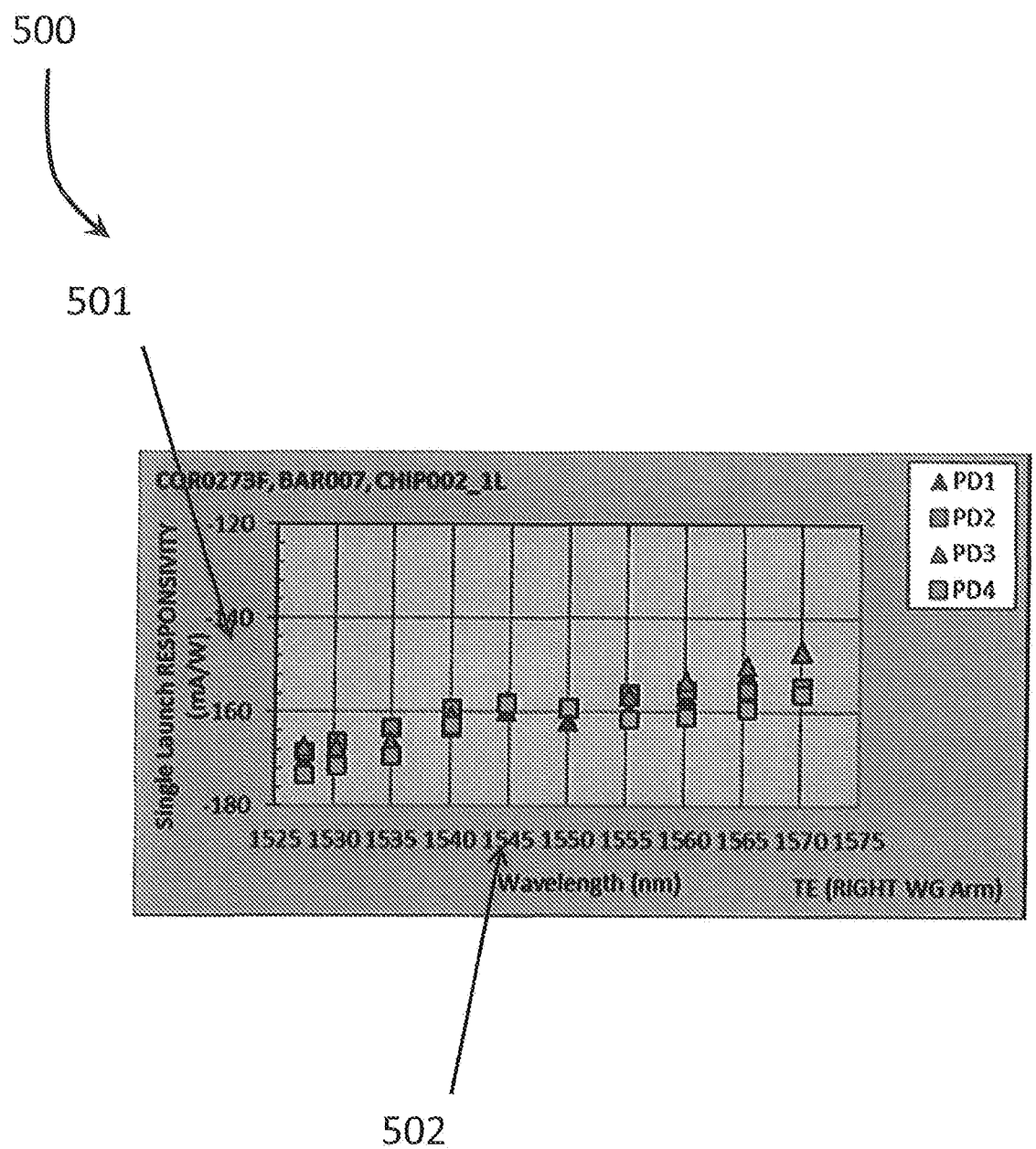
FIG. 5 is a graph which shows the experimental results of photodiode responsivity plotted against wavelength, measured on the second branch of the same detector.
Figure 6:
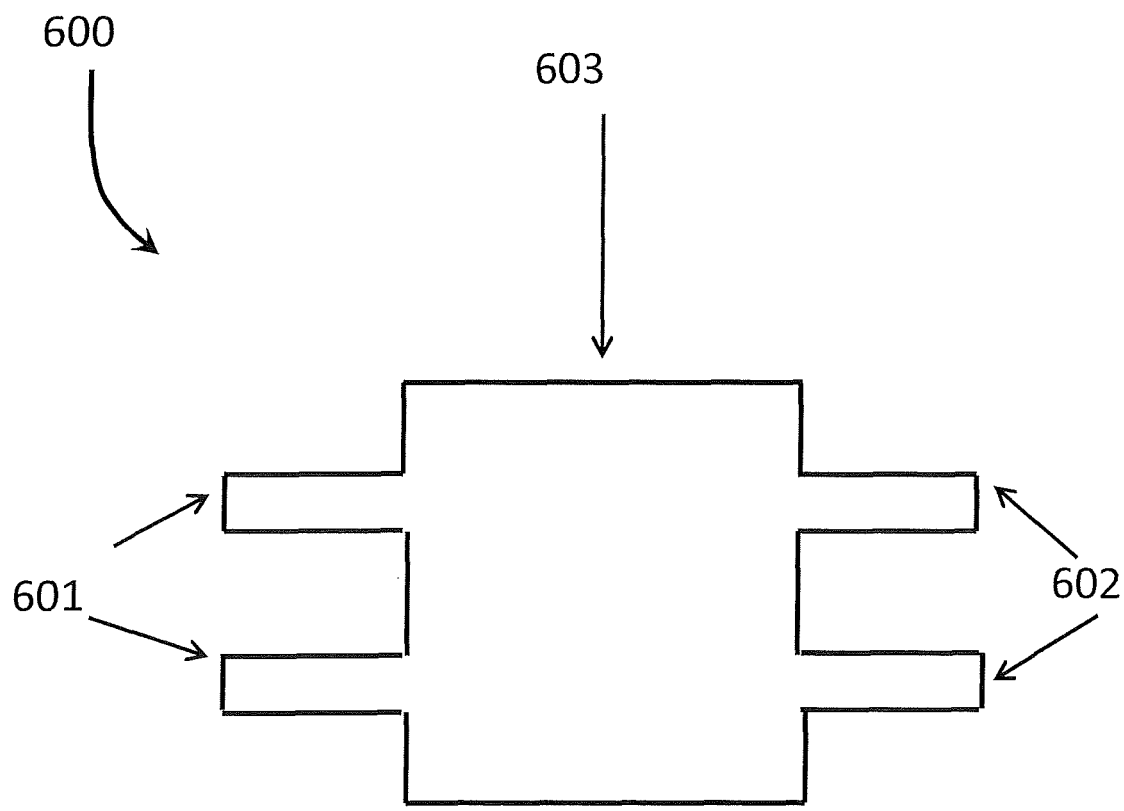
FIG. 6 is a schematic diagram of a Multimode Interference coupler according to the prior art.
Figure 7:
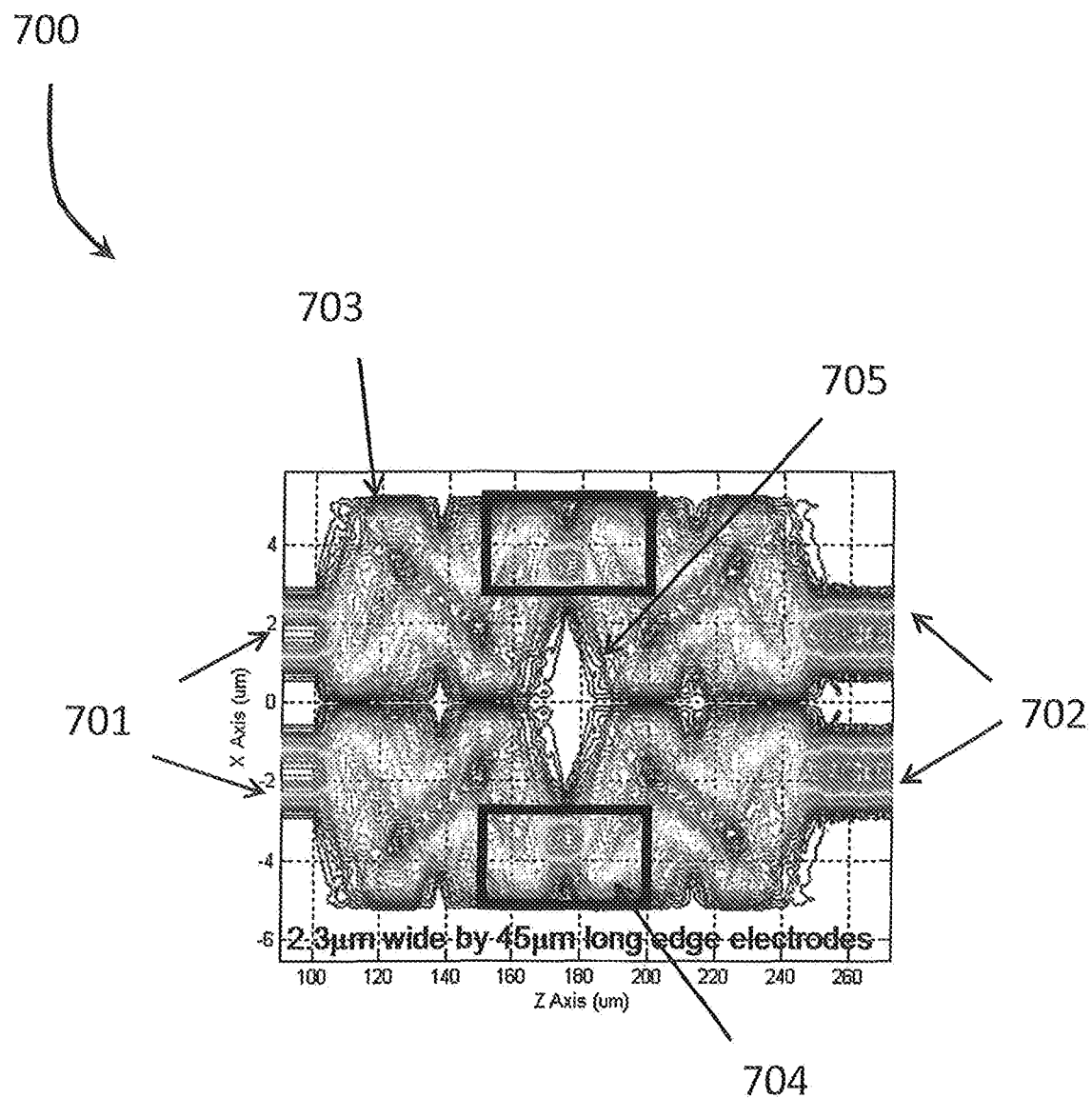
FIG. 7 is a schematic diagram of a tuned MMI coupler according to the prior art.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

In order to overcome the problems with imbalances in the optical losses described above, the present disclosure provides a method of applying a bias voltage to the waveguide sections of an optoelectronic device. Typically such a device will comprise an optical coupler. Typically the coupler is a multimode interference coupler. The difference between the use of the technique of the present disclosure and the methods of tuneable split ratio described above, is that in this disclosure a bias voltage is applied to one or more of the outputs of the multimode coupler. This can provide a mechanism of fine tuning for a tuneable split ratio MMI device or a method of overcoming the optical loss imbalance in a passive MMI coupler.

There are two mechanisms by which the optical loss of a semiconductor may be changed by the application of a negative bias voltage. The first is the free carrier effect and the second is the Franz-Keldysh effect. Both may be used in the balancing of optical losses between branches of an optical coupler.

The bandgap energy for most semiconductor waveguide devices is larger than that of the guided light. This ensures that large inter-band absorption losses are minimized. For this configuration the dominant absorption mechanisms then become Free carrier plasma effect (FCPE) and Inter-valence band absorption (IVBA). Both of these mechanisms require a population of electrons and holes in the conduction and valance bands, respectively, and their strength is directly proportional to this population size. Since direct inter-band absorption is not possible these charge carriers may be produced by thermal excitation, current injection and much weaker inter-band absorption through a low density of localized states, the so called Urbach tail.

When an electrical field is applied to a semiconductor waveguide, there are two competing effects which occur. These are the increasing optical absorption due to Franz-Keldysh effect and the reduction in optical absorption due to Free carrier plasma effect (FCPE) and Inter-valence band absorption (IVBA).

The Franz-Keldysh effect is a shift in the strong inter-band absorption edge of a semiconductor due to an applied electric field. This broadens and moves the absorption edge of the material to lower photon energies, or longer wavelengths, and therefore increases the strong inter-band absorption effect for photons at a fixed wavelength or energy. Since it is inter-band the absorption is accompanied by a photocurrent as optical energy is converted to electrical, and the photocurrent is proportional to the light intensity.

Figure 8:
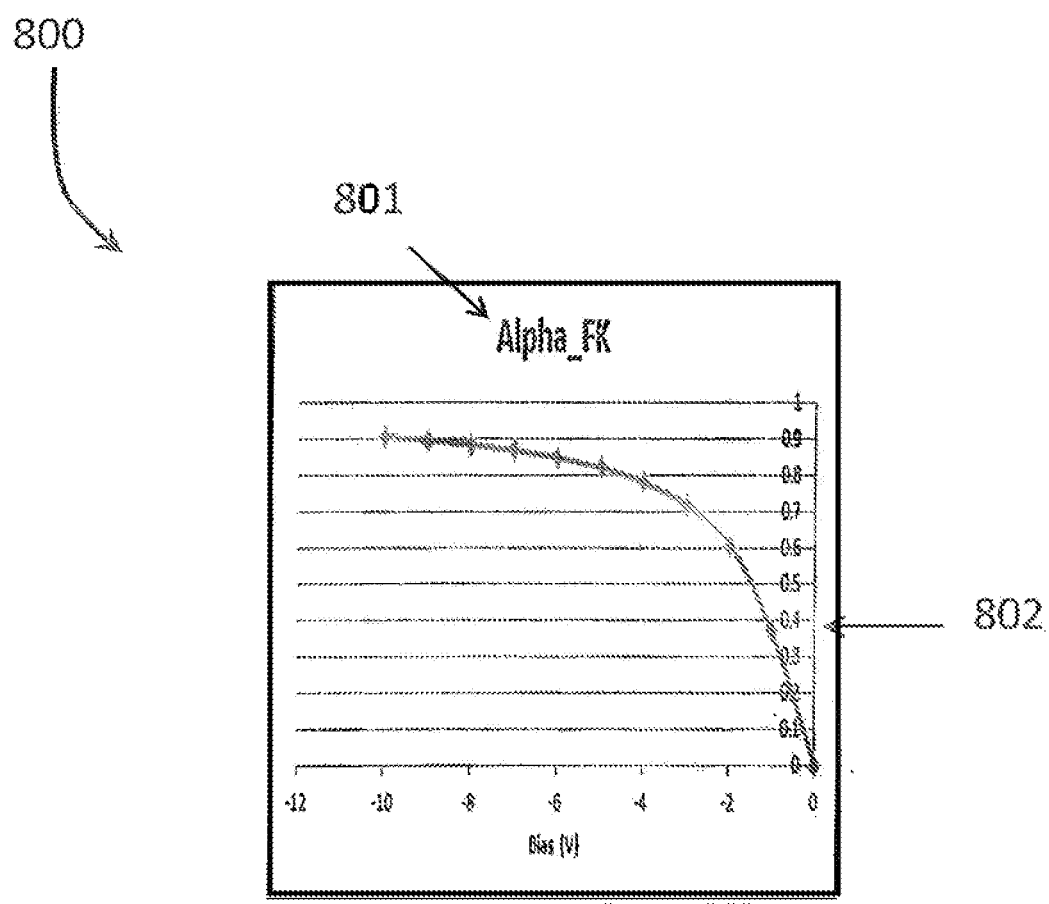
FIG. 8 is a graph of absorption coefficient against bias voltage caused by the Franz-Keldysh effect.

The competing effects in a semiconductor have been modelled to show how the absorption coefficient varies with bias voltage for each of the individual effects and the overall result. FIG. 8 is a graph 800 of normalised absorption coefficient 801 against bias voltage 802 due to the Franz-Keldysh effect. The result is an increase in the absorption coefficient as the bias voltage increases.

Figure 9:
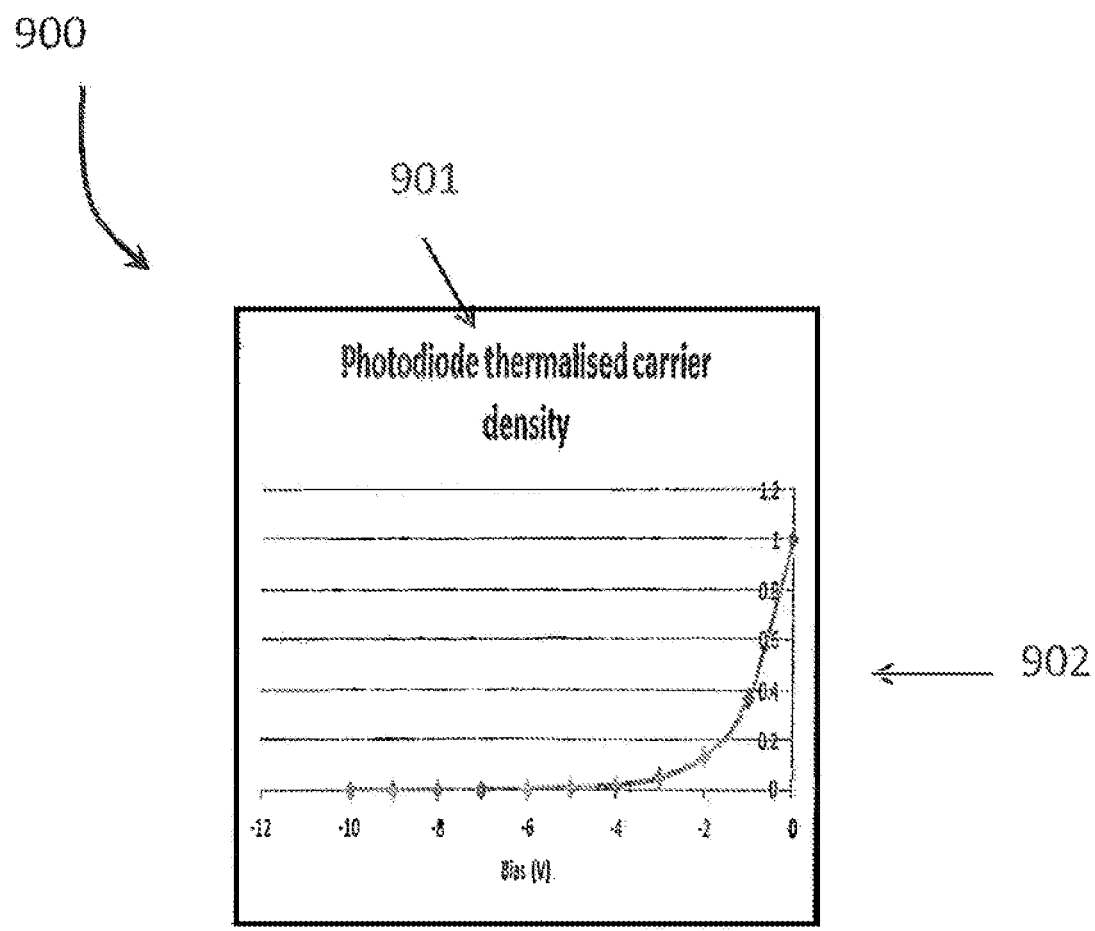
FIG. 9 is a graph of thermalized carrier density against bias voltage.

Published analytical expressions for the absorption coefficient strength due to FCPE and IVBA (Alpha_FCP) indicate that it is directly proportional to the waveguide carrier density N. This junction carrier density will diminish with increasing bias voltage. As the applied negative bias increases, the junction electric field increases and this encourages the charge carriers created through the weak inter-band Urbach tail absorption process to escape in the form of a small photocurrent. The result is a reduction in the steady state carrier density within the junction and a reduction in the FCPE and IVBA processes. At high enough bias the junction is completely depleted of charge carriers and the FCPE and IVBA processes are extinguished. FIG. 9, which is a graph 900 of thermalized carrier density 901 against bias voltage 902, illustrates this effect.

Figure 10:
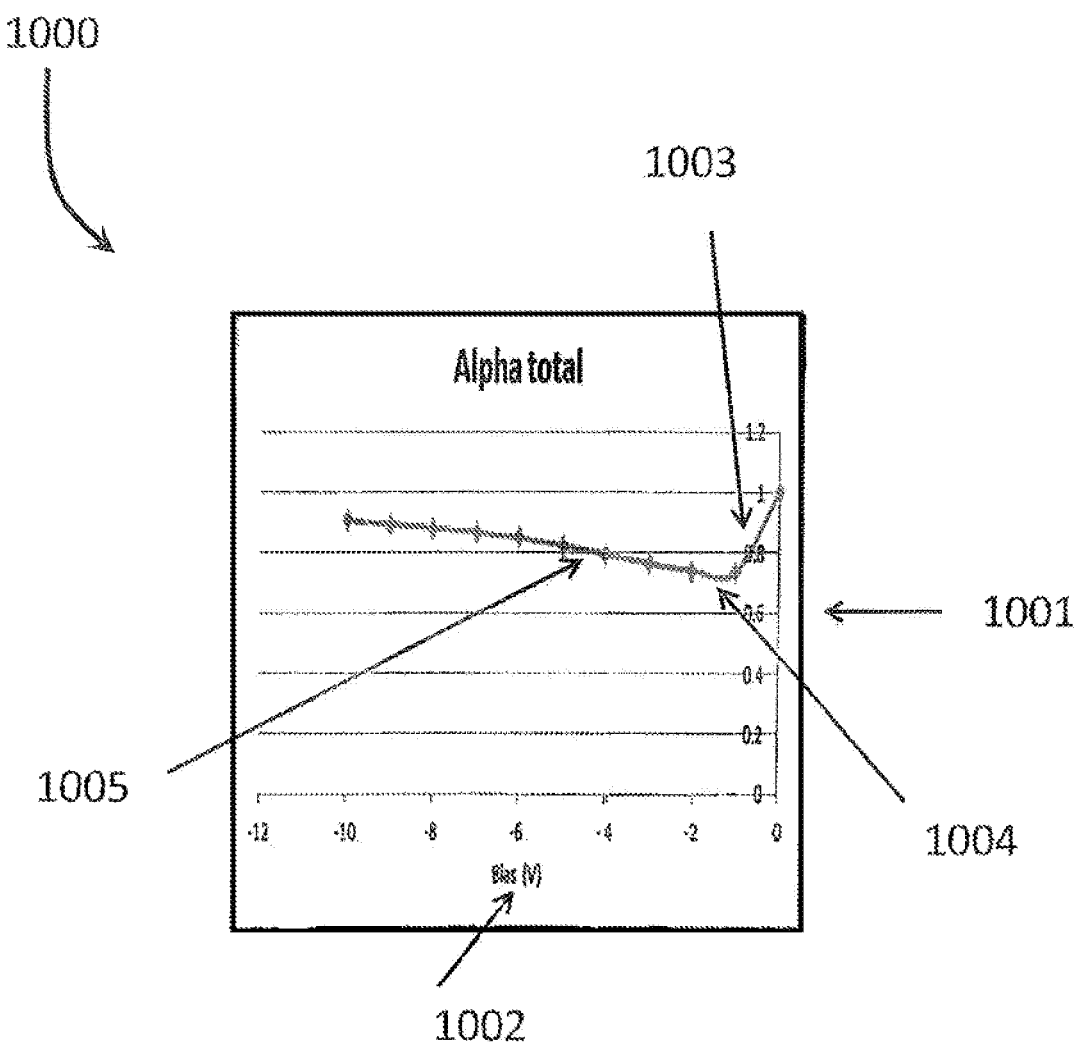
FIG. 10 is a graph of total absorption coefficient against bias voltage.

The combined effects of the FCPE/IVBA and the Franz-Keldysh effect have been modelled. FIG. 10 is a graph 1000 of the normalised total absorption coefficient 1001 against bias voltage 1002, which illustrate the combined effect of the two processes. The graph illustrates the initial domination 1003 of the removal of charge carriers at low bias voltage, with the absorption coefficient dropping to a minimum 1004. The Franz-Keldysh effect then starts to dominate absorption as bias voltage increases further 1005.

These results can be used to reduce the optical loss in a semiconductor optical waveguide by the application of an appropriately chosen negative bias voltage. There is a range of bias voltages in which the optical loss is lower than for no biasing. This is typically dependent on the wavelength of the incident light. In an embodiment an operating wavelength or range of wavelengths is selected, a determination is made of the bias range for which optical loss is lower than for no bias and a negative bias within that range is selected and applied to the waveguide.

Figure 11:
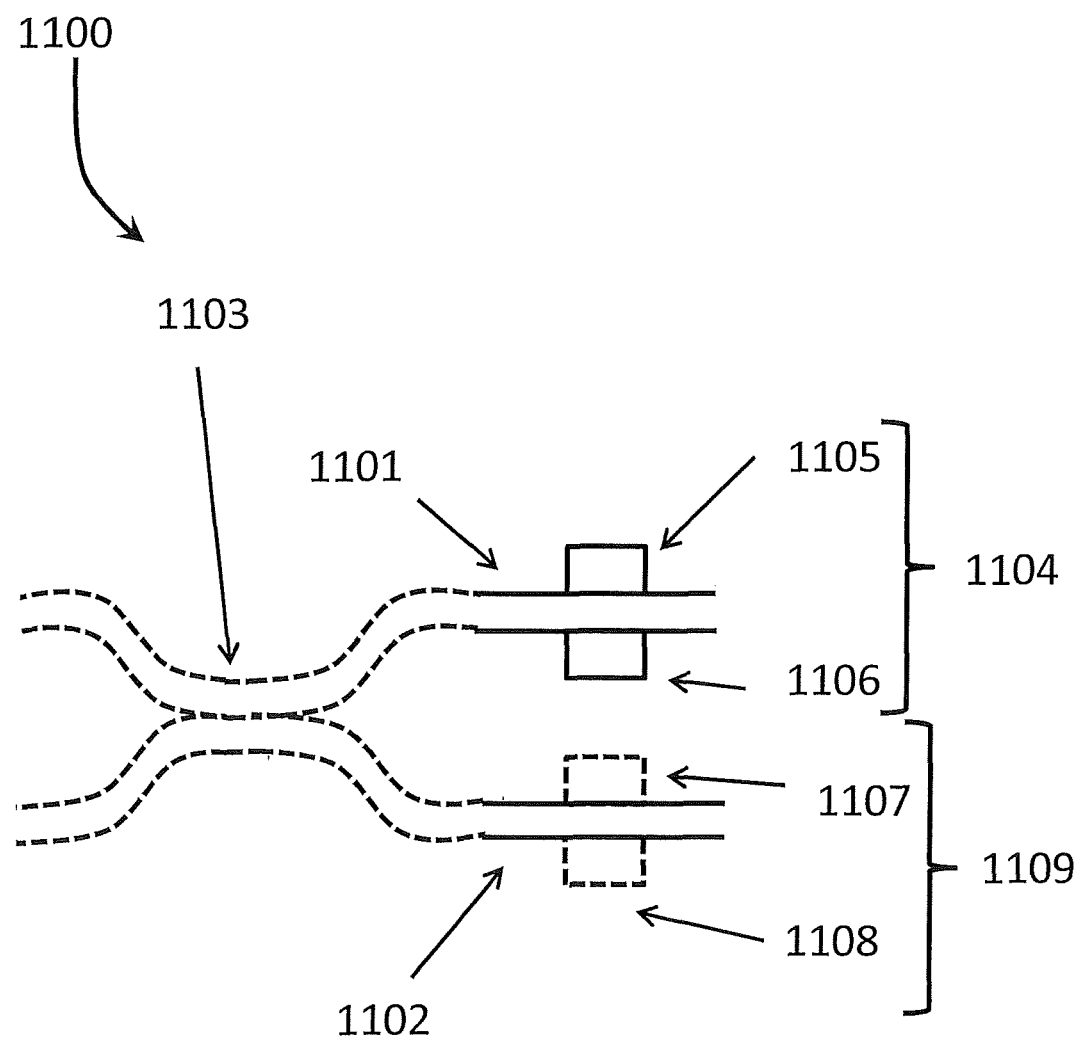
FIG. 11 is a schematic diagram of an apparatus comprising two semi-conductor waveguide sections with apparatus for providing a loss balancing bias voltage according to an embodiment.

FIG. 11 is a schematic diagram of an apparatus comprising two waveguide sections according to an embodiment. The apparatus comprises a first waveguide second 1101 and a second waveguide 1102. The purpose of the invention is to match as closely as possible the optical losses in the first waveguide section and the second waveguide section. This includes balancing of any split ratio imperfection in the coupler. Typically the matching of the optical losses would be to ensure that a signal from a single source, which is divided between the two waveguide sections, suffers the same loss through the two sections. In an embodiment, a coupler 1103 is provided to divide a signal between the two waveguide sections 1101, 1102. The signal may originate from a single input of the coupler or may arise from a combination of signals provided to each coupler input. Although the dividing of a single signal is typical, there may be other reason why the balancing of losses between two unlinked waveguide is necessary and the person skilled in the art will appreciate that this scenario would fall within the scope of the invention. In order to achieve a balancing of waveguide losses, in embodiment, there is provided a biasing apparatus 1104 comprising electrodes 1105, 1106 for applying a first biasing voltage to the first waveguide section 1101. In an embodiment there is provided a second biasing apparatus 1109, comprising electrodes 1108, 1107, for applying a second biasing voltage to the second waveguide section.

Figure 12:
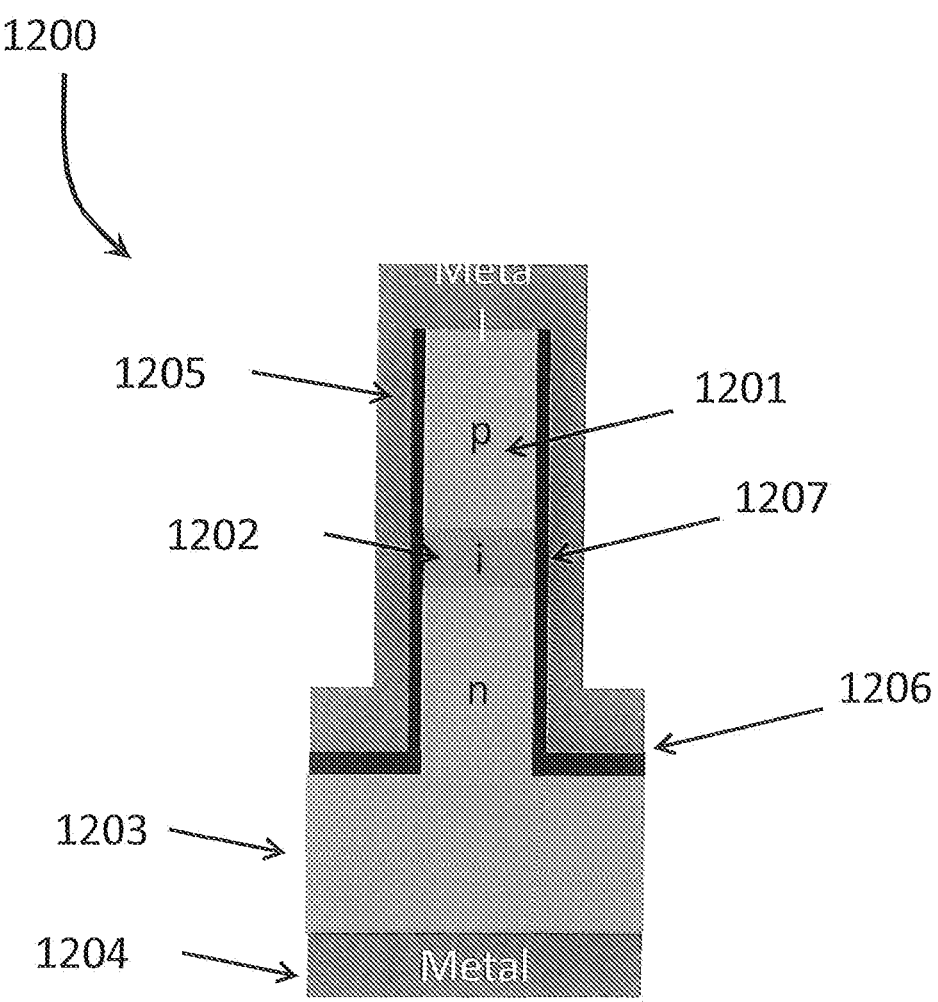
FIG. 12 is a cross sectional diagram of a waveguide used in an embodiment.

FIG. 12 is a cross sectional diagram of a strongly guiding waveguide 1200 suitable for modulators and detectors. Here the presence of sidewalls 1207 enables the bending of the waveguide, which is necessary for the structure of modulators and detectors. There is illustrated the p-doped 1201, intrinsic 1202 and n-doped 1203 layers of the guide, metal electrodes 1204, 1205 for the application of a negative bias and dielectric layer 1206.

Figure 13:
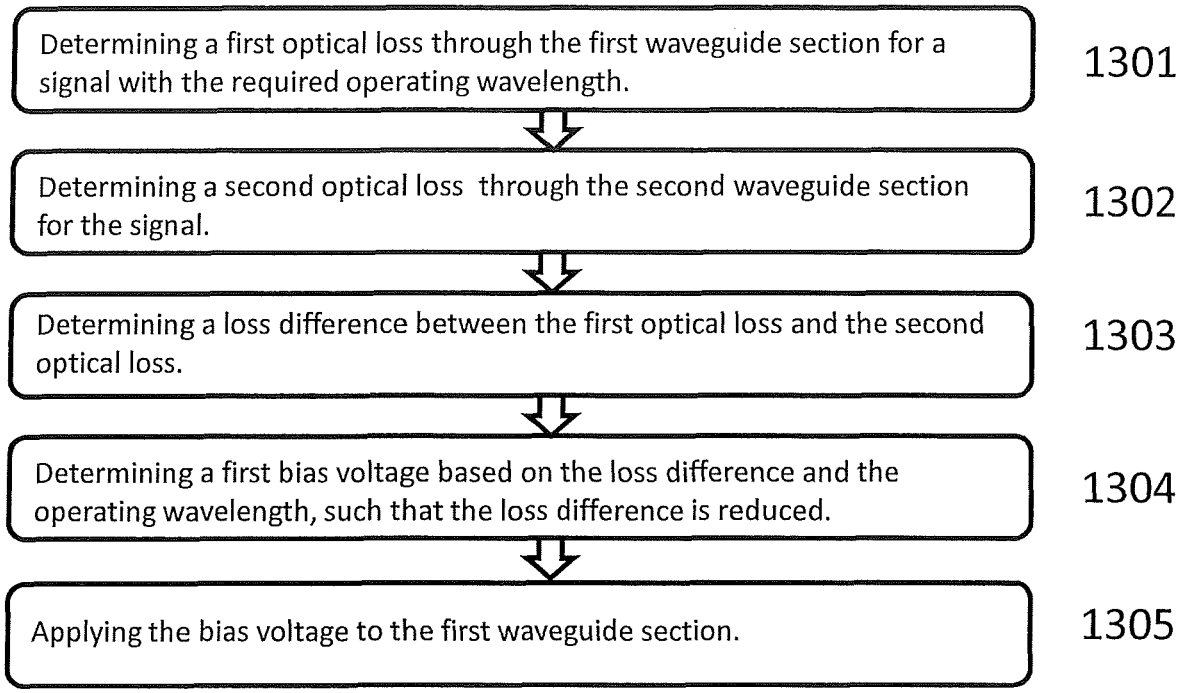
FIG. 13 is a flow chart illustrating a method of balancing waveguide loss according to an embodiment.

FIG. 13 is a flow chart illustrating the steps of a method of equalising optical losses between two waveguide sections according to an embodiment. Such losses are typically wavelength dependent and so loss measurements are typically made for an operating wavelength or wavelength band. However, the degree of wavelength dependence may vary from device to device. The person skilled in the art will appreciate that in some circumstances a single set of measurements and bias voltage corrections may be used for an entire range of wavelengths over which a device is used and that in other circumstances different measurements and/or corrections will be required. The steps of the method according to an embodiment comprise determining a first optical loss 1301 through the first waveguide section for a signal with the required operating wavelength, determining a second optical loss 1302 through the second waveguide section for the signal, determining a loss difference 1303 between the first optical loss and the second optical loss, determining a first bias voltage 1304 based on the loss difference and the operating wavelength, such that the loss difference is reduced and applying the bias voltage 1305 to the first waveguide section.

The determination of the applied voltage comprises determining a bias voltage which, when applied to one of the waveguides will balance the losses between the two guides. The bias voltage applied may have the effect of increasing or decreasing the optical loss in the waveguide section to which it is applied. The principal purpose is the reduction of the Common Mode Rejection Ratio.

Figure 14:
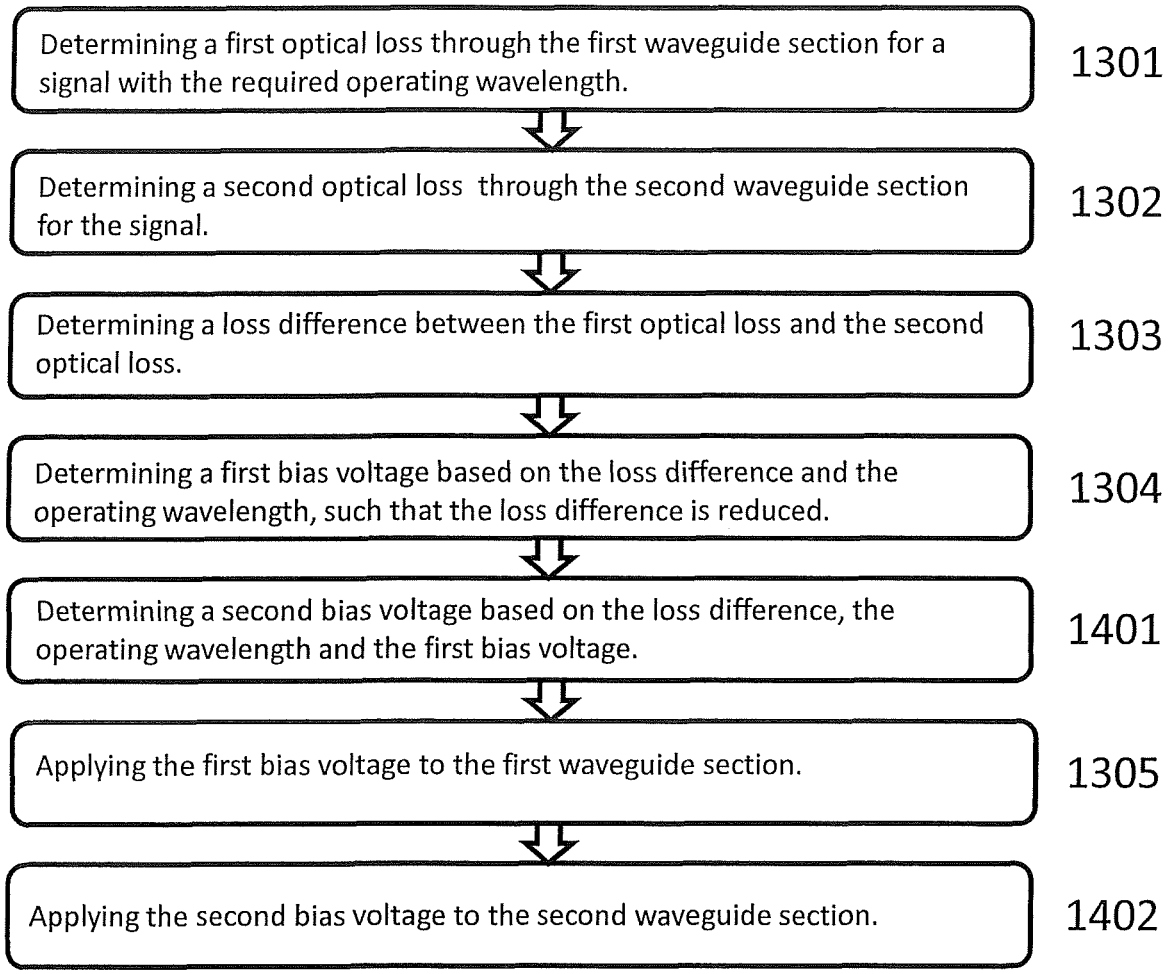
FIG. 14 is a flow chart illustrating a method of balancing waveguide loss according to another embodiment.

In an embodiment, bias voltages are applied to both waveguide sections. In an embodiment, these bias voltages are selected so as to improve the optical loss in at least one of the waveguide sections. FIG. 14 is a flow chart which illustrates the steps of this embodiment. This embodiment requires the second optional biasing means 1107 of FIG. 11. The method comprises the steps of the method according to FIG. 13, with the additional step of determining a second biasing voltage 1401 and applying 1402 the second biasing voltage to the second waveguide section. In an embodiment, at least one of the first bias voltage and the second bias voltage is selected such as to respectively reduce at least one of the first optical loss and the second optical loss.

Figure 15:
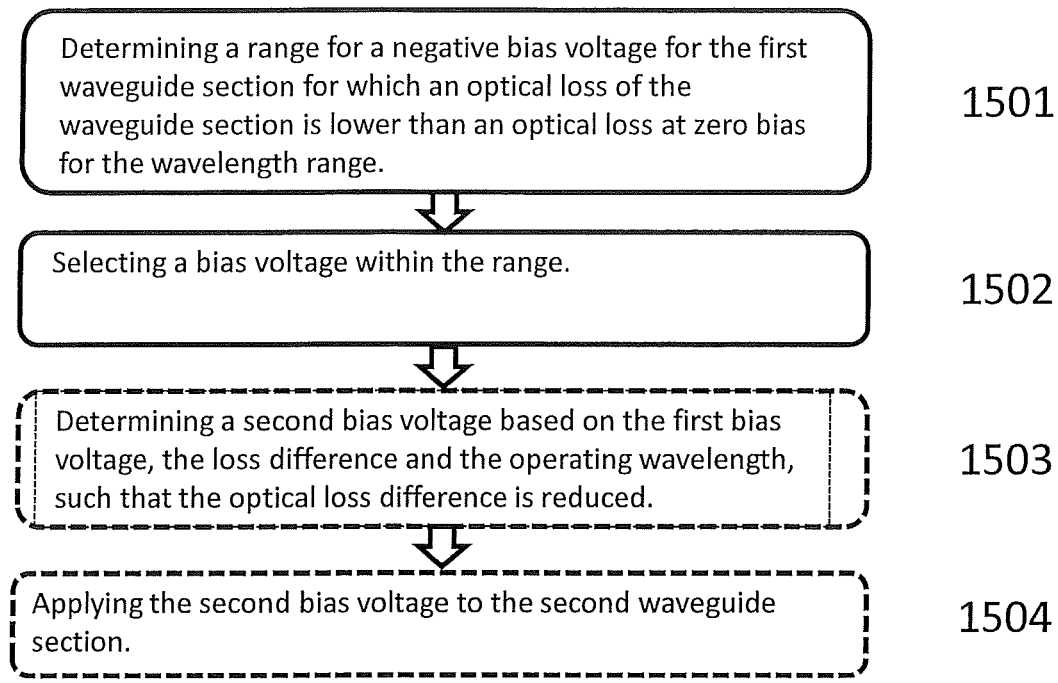
FIG. 15 is a flow chart illustrating a method of balancing waveguide loss according to yet another embodiment.

FIG. 15 is a flow chart for a method according to another embodiment. In this embodiment, the step of determining 1501 the first bias voltage comprises determining a range of negative bias voltages for which, when the negative bias is applied to the first waveguide section, an optical loss in the waveguide section at the required operating wavelength is lower than an optical loss when zero bias is applied to the first waveguide section for the operating wavelength and selecting 1502 a bias voltage within the range. In an embodiment, the method further comprises determining 1503 a second bias voltage based on the first bias voltage, the loss difference and the operating wavelength, such that the optical loss difference is reduced and applying 1504 the second bias voltage to the second waveguide section. In an embodiment, either the first or the second voltages are selected to minimize respectively the loss in the first or the second waveguide section. In another embodiment, the biasing voltages are selected such as to minimize the combined optical losses of the two waveguides.

Figure 16:
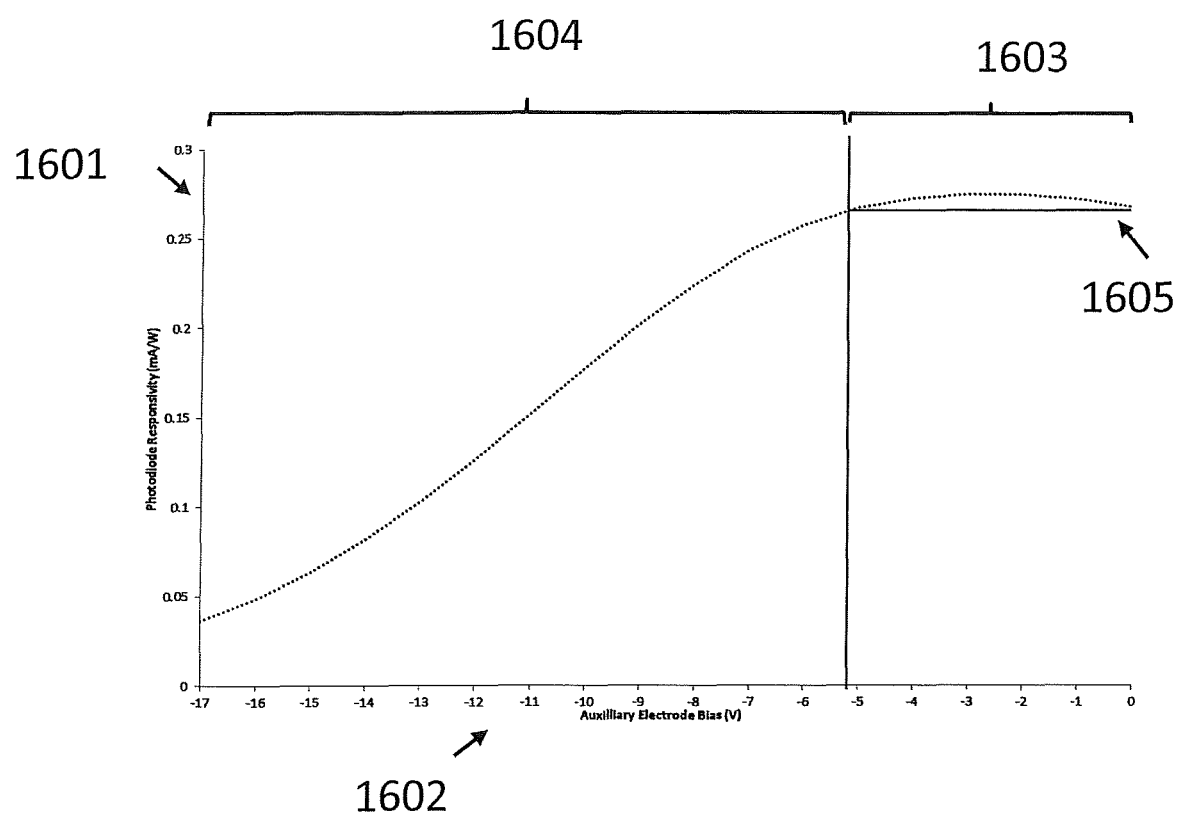
FIG. 16 is a graph illustrating variation of optical loss against biasing voltage for a semiconductor waveguide.

The step 1501 of determining a range of negative bias voltages for which, when the negative bias is applied to the first waveguide section, an optical loss in the waveguide section at the required operating wavelength is lower than an optical loss when zero bias is applied, comprises determining a bias voltage region in which the reduction in free carrier absorption dominates over the Franz-Keldysh effect. FIG. 16 is a graph which illustrates this region. It shows a typical measurement of the responsivity of a photodiode fed from a semiconductor waveguide containing a section in which an auxiliary bias voltage can be applied, plotted against this voltage, thereby effectively indicating the loss of the waveguide as a function of voltage. The graph is a plot of photo responsivity against 1601 against bias voltage 1602. There is a threshold 1603, which corresponds to the photo responsivity achieved at zero bias voltage. There are two regions of the graph, a first region 1604 in which the photo responsivity is higher than at zero bias voltage and a second region 1605, in which the photo responsivity is lower. In the first region, free carrier absorption reduction dominates and in the second region, the Franz-Keldysh effect dominates. The step of determining a range of negative bias voltages for which, when the negative bias is applied to the first waveguide section, an optical loss in the waveguide section at the required operating wavelength is lower than an optical loss when zero bias is applied to the first waveguide section comprises determining the range 1603 in which free carrier absorption reduction dominates. The selection of a voltage in this region ensures that a reduction in optical loss in the first waveguide may be achieved. A second biasing voltage is then selected for the second waveguide section on the basis of the first selected voltage and the loss difference.

The methods according to the embodiments above may be applied to any device in which it is required that losses in two semiconductor waveguide sections are balanced. It may be applied to the outputs of an optical coupler. The optical coupler may be part of a balanced photo-detector and the balancing of the losses may be to ensure that as accurate a reading as possible is made by the detector. The detector may be a coherent detector.

In an embodiment, the methods are used to deal with differing waveguide losses in the branches of a coherent receiver caused by imperfections in the power split ratio of a Multimode Interferometer (MMI). Together with waveguide bends and cross-overs, these imperfections may result in photodetectors in the coherent receiver having different effective responsivity. In an embodiment, active electrodes are placed on one or more of the output waveguides, and are used to trim, i.e. increase or decrease the responsivity depending on negative bias voltage applied. This allows an improved matching of the photodiode responsivities. In an embodiment, negative biasing is used to improve the responsivity in the detectors with lower responsivity to match them better with detectors with higher responsivities. In an embodiment, a loss value is increased to achieve balance. In an embodiment, the MMI coupler is a 4×4 MMI coupler. The combined MMI CMRR with bend and waveguide cross-over loss is typically wavelength dependent. There are complex wavelength dependent manufacturing errors which in some circumstances. These may not be compensable by application of bias voltages according to the above techniques, which are typically only slightly wavelength dependent and hence could be considered by the skilled person as not adequate. However, the present disclosure however recognises that the technique can be used to correct errors in many instances of devices manufactured with wavelength independent offsets in the responsivity of a pair of detectors and provide improvement in instances where the errors are wavelength dependent.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of equalising optical losses, at a required operating wavelength, in waveguide sections in an optoelectronic device comprising a first semiconductor waveguide section and a second semiconductor waveguide section, the method comprising:
   determining a first optical loss through the first semiconductor waveguide section for a signal with the required operating wavelength;
   determining a second optical loss through the second semiconductor waveguide section for the signal;
   determining a loss difference between the first optical loss and the second optical loss;
   determining a first bias voltage based on the loss difference and the required operating wavelength, such that the loss difference and the first optical loss are reduced, wherein determining the first bias voltage comprises:
      determining a range of negative bias voltages for which, when a negative bias is applied to the first semiconductor waveguide section, an optical loss in the first semiconductor waveguide section at the required operating wavelength is lower than an optical loss when zero bias is applied to the first semiconductor waveguide section for the required operating wavelength; and
      selecting a bias voltage within the range; and applying the first bias voltage to the first semiconductor waveguide section.

2. The method of claim 1, further comprising:
determining a second bias voltage based on the loss difference, the required operating wavelength, and the first bias voltage; and
applying the second bias voltage to the second semiconductor waveguide section.

3. The method of claim 2, wherein the second bias voltage is selected to reduce the second optical loss.

4. The method of claim 1, further comprising:
determining a second bias voltage; and
applying the second bias voltage to the second semiconductor waveguide section,
wherein determining the second bias voltage comprises:
determining a bias voltage based on the first bias voltage, the loss difference, and the required operating wavelength, such that the loss difference is reduced.

5. The method of claim 1, wherein the first semiconductor waveguide section and the second semiconductor waveguide section are optically connected to a first output of an optical coupler and a second output of the optical coupler, respectively.

6. The method of claim 5, wherein the optical coupler is a multi-mode interference coupler.

7. The method of claim 5, wherein the optical coupler is used in a balanced optical detector.

8. The method of claim 5, wherein the optical coupler is used in a coherent optical detector.

9. An optoelectronic device comprising:
a first waveguide section with a first optical loss;
a second waveguide section with a second optical loss; and
a biasing apparatus configured to:
determine a range of negative bias voltages for which, when a negative bias is applied to the first waveguide section, an optical loss in the first waveguide section at a required operating wavelength is lower than an optical loss when zero bias is applied to the first waveguide section for the required operating wavelength;
select a negative bias voltage within the range, wherein the negative bias voltage is selected such that, when applied to the first waveguide section, the first optical loss and a difference between the first optical loss and the second optical loss are reduced; and
apply the negative bias voltage across the first waveguide section.

10. The optoelectronic device of claim 9, further comprising:
another biasing apparatus for providing a negative bias voltage across the second waveguide section.

11. The optoelectronic device of claim 9, further comprising:
an optical coupler,
wherein the first waveguide section and the second waveguide section are optically connected to a first output of the optical coupler and a second output of the optical coupler, respectively.

12. The optoelectronic device of claim 11, wherein the optical coupler is a multimode interference coupler.

13. A balanced optical detector comprising the optoelectronic device of claim 9.

14. A coherent detector comprising the optoelectronic device of claim 9.

* * * * *